(No Model.)
2 Sheets—Sheet 2.
S. J. SULLIVAN.
CHURN.
No. 359,645.　　　　　　　　　　Patented Mar. 22, 1887.
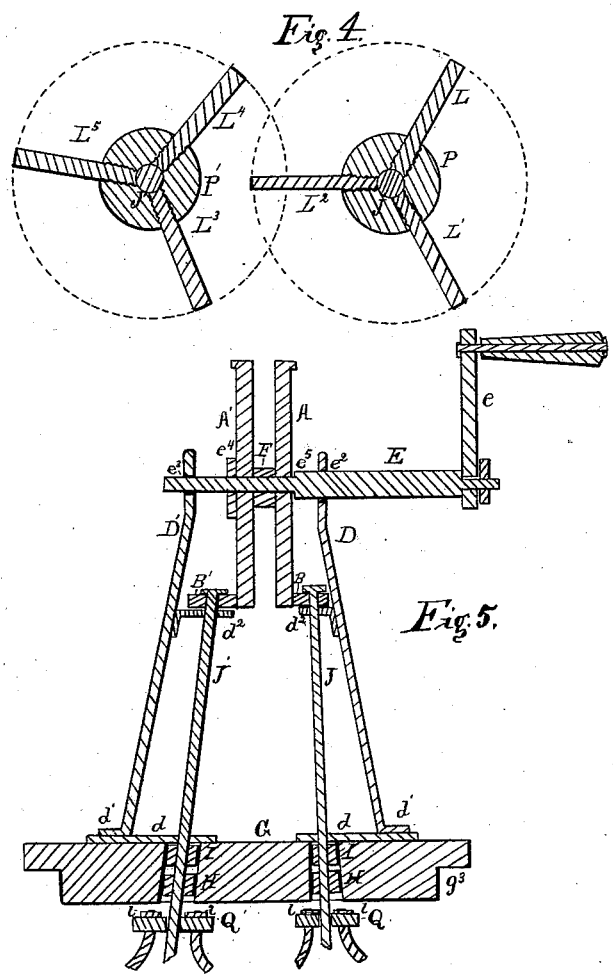
Witnesses.
G. A. Haseltine
N. A. Haseltine
Inventor.
Samuel J. Sullivan
By S. A. Haseltine & Bro.
Attorneys.

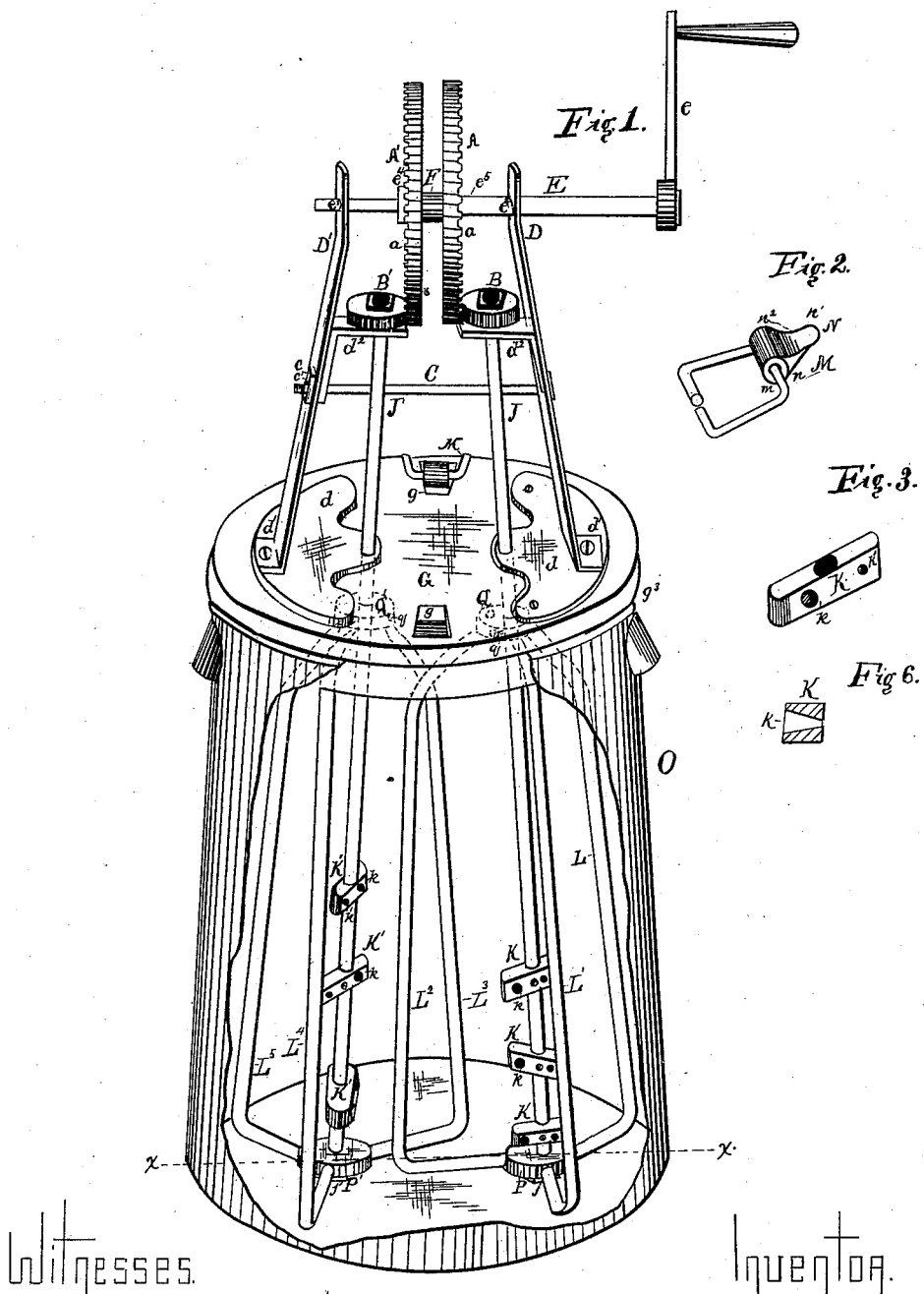

UNITED STATES PATENT OFFICE.

SAMUEL JAMES SULLIVAN, OF LAMAR, MISSOURI.

CHURN.

SPECIFICATION forming part of Letters Patent No. 359,645, dated March 22, 1887.

Application filed July 6, 1885. Serial No. 170,667. (No model.)

*To all whom it may concern:*

Be it known that I, SAMUEL JAMES SULLIVAN, a citizen of the United States, residing at Lamar, in the county of Barton and State of Missouri, have invented certain new and useful Improvements in Churns; and I do hereby declare the following to be a full, clear, and exact description of the invention, such as will enable others skilled in the art to which it appertains to make and use the same.

My invention relates to churns having rotary dashers; and its object is to provide a cheap, simple, convenient, and easily-operated device for quickly obtaining butter from cream, and one to prevent all spilling out of cream from the vessel, and also the sucking in of dust, as well as one the dashers and gearing of which are easily and quickly adjustable to different sizes of vessels. These objects I attain by means of the device illustrated in the accompanying drawings, forming a part of this specification, in which—

Figure 1 is a view in perspective of the device, a part of the vessel being removed to show the interior. Fig. 2 is a detail of the catch. Figs. 3 and 6 are details of one of the paddles. Fig. 4 is a sectional view on the line $x\ x$ of Fig. 1. Fig. 5 is a vertical section.

Similar letters of reference indicate corresponding parts in the several figures.

A A' represent drive-wheels, of any desired size, preferably having the cogs $a$ on the outside to engage the pinions B B'. Said wheels are secured to an axle, E, which is provided with a suitable shoulder, $e^5$, and a nut, $e^4$, for holding the wheels firmly in place. Said axle has suitable bearings at $e^2\ e^3$ in the uprights D D', and is provided with a winch, $e$.

F is a washer, of any desired size and thickness, placed on the axle E between the drive-wheels, for placing them any desired distance apart.

D D' are supports having arms $d^2\ d^2$, for providing bearings and supports for the dasher-rods J J', and foot-pieces $d'\ d'$, to firmly secure the same to the pieces $d\ d$, which are firmly secured to the cover. The cover is preferably of one piece, and the parts $d\ d$ on the cover receive the dasher-rods, and they also serve to keep the packing I I in place around the dasher-rods.

C is a regulating-rod provided with nuts $c\ c'$ for adjusting the uprights D D', so as to make the drive-wheels and pinions properly engage or mesh. Cover G is provided with a rabbet, $g^3$, cut in the edge, to cause the same to fit closely over and in the top of the vessel O. Said cover is provided with indentations or concavities $g$ for receiving catches.

M is a clasp hinged to the side of the vessel, so as to swing up over the cover, and to its upper end is secured a cam or eccentric, N, which can turn back down into the concavity $g$, as shown, the large part $n$ of which holds the cover firmly in place. Said cam is extended to form a handle, $n'$. The cam has a thin side, $n^2$, made thin and concave from where the cam passes around the clasp M to the end of the handle $n'$, so that by turning the handle forward the clasp may be loosened. These catches are secured on opposite sides of the vessel O, to hold the cover firmly for supporting the gearing and to prevent the escape of cream. In this cover are made two holes for the dasher-rods J' J, in which are placed suitable boxes, H H, and packings I I. Said holes may be placed any desired distance apart to suit the size of the vessel, so that the dashers may be adjusted in width to fill it, and at the same time hang perpendicular by lengthening the rod C and substituting a larger washer for the washer F.

I I are packings, of cork or other suitable material, which may be placed between the boxing H H and foot-pieces $d\ d$, to prevent the escape of cream from or the entry of dust into the vessel.

Dasher-rods J J' are made to reach from their attachments above the pinions down through the pinions B B', arms $d^2\ d^2$, foot-pieces $d\ d$, packing I I, boxings H H, cover G, heads Q Q' P P', and nuts $j\ j'$ nearly to the bottom of the vessel, and said rods are attached so as to revolve with the pinions in opposite directions.

K K' are paddles attached by set-screws or other suitable means to the dasher-rods and alternating with each other, as shown. Said paddles have perforations or holes made tapering or funnel-shaped, the large opening $k$ being in front, so as to drive the cream through, and thus assist in stirring the same.

P P' Q Q' are heads attached by set-screws $q$, or other suitable means, to the dasher-rods, near the bottom and top of the vessel, for securing the dashers L L' L² L³ L⁴ L⁵. Said dashers are screwed or otherwise firmly secured in the heads P P', from which they extend outward nearly to the sides of the vessel, thence parallel with the sides of the vessel nearly to the top, from whence they are curved in under and pass up through the upper heads, Q Q', where they are secured by nuts $l$. These dashers are preferably six in number, attached so as to intersect each other's track without interfering as they are revolved in opposite directions.

Having thus described my invention, what I claim as new, and desire to secure by Letters Patent, is—

1. The combination, with a regulating-rod, C, having nuts $c\ c'$, of supports D D', having feet $d\ d\ d'\ d'$, arms $d^2\ d^2$, drive-wheels A A', shaft E, washer F, nut $e^4$, shoulder $e^5$, and pinions B B', substantially as and for the purpose set forth.

2. The combination, with a churn vessel and cover, of a shaft, E, having a shoulder, $e^5$, winch $e$, washer F, and nut $e^4$, supports D D', having arms $d^2\ d^2$ and feet $d\ d\ d'\ d'$, a regulating-rod, C, having nuts $c\ c'$, dasher-rods J J', with dashers L L' L² L³ L⁴ L⁵, secured in caps or heads P P' Q Q', and having paddles K K', with openings $k$, said dasher-rods having pinions B B', engaging the drive-wheels A A', boxings H H, and packing I I, all substantially as and for the purpose set forth.

In testimony whereof I have affixed my signature in presence of two witnesses.

SAMUEL JAMES SULLIVAN.

Witnesses:
H. C. CARTMEL,
ISAAC P. PARSONS.